United States Patent Office 2,746,122
Patented May 22, 1956

2,746,122
METHOD OF STABILIZING THE RESISTANCE CHARACTERISTICS OF SELENIUM RECTIFIER CELLS

Henry J. Zygmunt, Braddock, and Linnie K. Hedding, Wilkinsburg, Pa., assignors to Westinghouse Air Brake Company, Wilmerding, Pa., a corporation of Pennsylvania No Drawing. Application May 17, 1952,
Serial No. 288,565

10 Claims. (Cl. 29—25.3)

Our invention relates to selenium rectifiers and particularly to an improved method of stabilizing the forward and reverse resistance of selenium rectifier cells.

According to one well-known method of manufacturing selenium rectifier cells, selenium or a compound of selenium in powdered form is evenly distributed over the roughened surface of a suitable base plate. The base plate with the selenium thereon is placed in a heated press and there subjected to a pressure and heat treatment to convert the selenium to its electrically conducting state. The rectifier element is then further heat treated a an elevated temperature for several minutes and thereafter allowed to cool to room temperature. A counterelectrode of a tin-cadmium alloy containing traces of thallium is then sprayed or otherwise deposited on the selenium layer. The rectifier element is thereupon subjected to an electrical forming process, preferably at an elevated temperature.

It has been found that selenium rectifier cells are sensitive to temperatures above and below the ordinary range of temperatures. Exposure to such temperatures affects adversely and permanently the forward and reverse resistance characteristics of the cells, the forward resistance being increased and the reverse resistance being decreased. Rectifier cells manufactured in accordance with prior art methods are also susceptible to shelf aging whereby changes in the electrical characteristics of the rectifier will take place during storage of the cells. These changes in the characteristics or "aging" of the cells result in unstable operation and are accompanied by high losses.

An object of our invention is to provide a method of manufacturing selenium rectifier cells whereby the rectifier cells so processed exhibit markedly improved stability during and after subsequent exposures to extremes of temperature.

A further object of this invention is to provide a method of manufacturing selenium rectifier cells whereby the forward and reverse resistance of the rectifier cells are stabilized to permit operation of the cells in ambient temperatures above and below the normal range of ambient temperatures.

In accordance with our invention, after the selenium cells are processed and electroformed by any of the well-known methods of manufacturing selenium rectifier cells, the rectifier cells are subjected to a cold treatment to stabilize the forward and reverse resistance of the cells. We have found that cooling selenium rectifier cells from room temperature to the lowest temperature at which the cells will be used in service and maintaining the cells for several hours at this relatively low temperature will stabilize the forward resistance of the cells against permanent changes due to further exposure to low temperatures. Such treatment also retards the rate of forward aging at high temperatures which is characteristic of selenium rectifier cells not so treated. Excellent stabilization of the forward resistance of the cells is obtained by maintaining the cells between approximately —30° F. and —100° F. for approximately four to sixteen hours.

It has been found that during the initial four-hour period of exposure to low temperatures, the forward resistance of the rectifier cells tends to increase somewhat. A point is ultimately reached however where the forward resistance of the cells exhibits a noticeable tendency to stabilize at a definite value. This is approximately four hours for some of the different cells investigated. Further exposure will result in a point being reached where there is a negligible further increase in the forward resistance. We have found that sixteen hours is usually adequate to effect complete stabilization of the forward resistance.

Although the stabilizing treatment at low temperatures increases the forward resistance of the rectifier cell to some extent, the resulting forward resistance of the cell does not exceed a useable value, nor will the forward resistance increase upon subsequent exposure to low temperatures. The rate of aging at high temperatures is also greatly lessened by the low temperature stabilization treatment of the cell.

Cold stabilization treatment of selenium rectifier cells will also decrease the reverse resistance somewhat. We have found however that by repeatedly subjecting selenium cells to cold treatments, with intervening electroforming treatments of the cells, that the reverse resistance of the selenium cells may be increased and stabilized at the highest possible level consistent with the inherent forming capability imparted to the cells by the processing procedures. In carrying out our methods of cold stabilization of the reverse resistance of selenium cells, as hereinafter more fully described, we prefer to reform the cells after the cells have warmed up to room temprature by employing the process described in Letters Patent of the United States No. 2,510,322, issued on June 6, 1950, to Robert E. Shearer for Selenium Rectifiers, in which process the rectifier cells are maintained at an elevated temperature of approximately 140° F. to 158° F. Other forming procedures may be employed however.

In our experiments to determine temperatures at which the reverse resistance of the rectifier cells may be stabilized and the exposure periods for effecting such stabilization, we have exposed formed selenium cells to various low temperatures ranging from 30° F. to approximately —100° F. for periods varying from five minutes to sixteen hours. The results of these tests indicated that repeated exposure to a temperature below 0° F. is effective in stabilizing the reverse resistance of seleium cells, and that the actual exposure time required may only be that necessary for all portions of the rectifier cell to attain the stabilizing temperature.

In one series of tests conducted by us wherein selenium cells were exposed to a stabilizing temperature of approximately —100° F. for five minutes, the decrease in the reverse resistance was 39.1%. Selenium cells which were exposed to the stabilizing temperature of —100° F. for fifteen minutes showed a decrease in reverse resistance of 39.7%. Using the same stabilizing temperature and extending the time of exposure, selenium cells exposed for one hour showed a decrease in reverse resistance of 45.3%; those cells exposed for four hours showed a decrease in the reverse resistance of 54.2%; and cells exposed for sixteen hours showed a decrease in reverse resistance of 55.7%.

In another test made by us, selenium cells which were exposed to a stabilizing temperature of —65° F. for five minutes, showed a decrease in reverse resistance of 28.8%. Cells exposed to this stabilizing temperature for fifteen minutes showed a decrease in reverse resistance of 30.4%. After one hour exposure the decrease was 29.9%; after four hours it was 42.2% and after sixteen hours it was 47.3%.

It is evident from the percentage values given, that the greatest decrease in the reverse resistance of the selenium cells takes place within the first five minutes of exposure time, with very little change taking place after the first four hours of exposure.

Other tests made by us bear out these observations. As for example, in a test wherein selenium cells were exposed to a stabilizing temperature of —30° F., the percent decrease in reverse resistance after 5 minutes was 5.39%; after fifteen minutes it was 2.09%; after one hour, it was 1.20%; after four hours it was 8.66% and after sixteen hours it was 14%.

After the selenium cells used in our tests were exposed to the low stabilizing temperatures, the cells were reformed in the manner described, thereby increasing the reverse resistance values of the cells to approximately the initial values obtained by the processing procedures employed. The cells were again exposed to the same stabilizing temperatures. In the tests wherein the cells were exposed to the stabilizing temperature of approximately −100° F. the selenium cells which were exposed for the second time for five minutes showed a decrease in reverse resistance of 6.64%, while those cells which were exposed for the second time for fifteen minutes showed a decrease of 4.5%. The selenium cells which were exposed for a second time for one hour showed a decrease in reverse resistance of 5.0%; those exposed a second time for four hours a decrease of 5.7%; while those cells exposed a second time for sixteen hours showed a decrease in reverse resistance of 7.3%.

The group of cells exposed to the stabilizing temperature of −65° F. which were reformed and subsequently exposed to this stabilizing temperature indicated the same reduction in the decrease of reverse resistance as indicated by the percentages hereinabove given. After a second exposure for five minutes the decrease in reverse resistance of the selenium cells was 8.53%. After a second exposure for fifteen minutes the decrease in reverse resistance was 4.3%. Selenium cells which were exposed for the second time to this stabilizing temperature for one hour showed a decrease in reverse resistance of 4.2%; while cells which were reexposed for four and sixteen hours showed a decrease in reverse resistance of 8.5% and 16.6% respectively.

The cells exposed to a stabilizing temperature of −30° F. were reformed and subjected a second time to the stabilizing temperature of −30° F. After a second exposure of five minutes the reverse resistance of the cells decreased 1.41%; after fifteen minutes, .17%; after on hour, .41%; after four hours, 1.13%; and after sixteen hours the reverse resistance decreased 1.57%.

It will be noted that after the second exposure of the selenium cells to the stabilizing temperatures, the decrease in reverse resistance of the cells is materially reduced. We have found that a third exposure of the selenium cells to stabilizing temperatures after the cells have been reformed for a second time may again decrease somewhat the reverse resistance values of the cells so treated, but the decrease in the reverse resistance value of the average selenium cell will be extremely small.

For a better appreciation of the results obtained by us in stabilizing the reverse resistance of selenium rectifier cells by our method of exposing the cells at least twice to comparatively low temperatures and reforming the cells after each cold treatment except the last, we include herewith a summary of our tests showing the percent decrease in the reverse resistance of the selenium cells which were exposed to different low temperatures for various periods of time.

| Temperature During Exposure | Exposure Number | Percent Decrease in Reverse Resistance Exposure Periods | | | | |
|---|---|---|---|---|---|---|
| | | 5 Min. | 15 Min. | 1 Hr. | 4 Hrs. | 16 Hrs. |
| −93° F | 1 | 39.1 | 39.7 | 45.3 | 54.2 | 55.7 |
| | 2 | 6.64 | 4.5 | 5.0 | 5.7 | 7.3 |
| | 3 | 0.23 | −0.73 | 0.59 | 0.31 | 1.1 |
| −65° F | 1 | 28.8 | 30.4 | 29.9 | 42.2 | 47.3 |
| | 2 | 8.53 | 4.3 | 4.2 | 8.5 | 16.6 |
| | 3 | 0.96 | 0.50 | 0.44 | 0.83 | 0.88 |
| −30° F | 1 | 5.39 | 2.099 | 1.209 | 8.665 | 14.01 |
| | 2 | 1.41 | 0.178 | 0.417 | 1.134 | 1.571 |
| | 3 | 0.53 | 0.870 | −0.0025 | 0.207 | −0.035 |
| 0° F | 1 | −1.74 | −3.11 | −0.83 | −5.13 | −2.7 |
| | 2 | −0.352 | 0.50 | 0.44 | 0.201 | 0.68 |
| | 3 | 0.0 | −1.3 | 0.98 | −0.46 | −0.47 |

In the above table the negative (−) percentages indicate an increase in the reverse resistance.

The selenium rectifier cells after being subjected to the repeated cycle of cooling and reforming, were tested for stability in operation in an ambient temperature range of from −93° F. to 158° F. The cells treated by our cold stabilizing method showed excellent stability within this temperature range, which range may reasonably be expected in service. As for example, the cells of the above table which were exposed to a stabilizing temperature of −93° F. for three sixteen-hour periods showed, after exposure to an ambient temperature of 140° F. for sixteen hours, a decrease in reverse resistance of only 1.87% and in increase in the forward resistance of only 1.32%. These same cells after exposure to a temperature of 158° F. for sixteen hours followed by an exposure to a temperature of −65° F. for sixteen hours showed a decrease in reverse resistance and an increase in forward resistance of approximately 4%. The cells of the above table which were exposed to a stabilizing temperature of −30° F. for three five-minute periods, after exposure to an ambient temperature of −30° F. for sixteen hours showed no decrease in reverse resistance and only 1.3% increase in forward resistance. Another example of the excellent stability imparted to selenium cells treated by our methods is the test made on the cells of the above table which were treated in a stabilizing temperature of 0° F. for sixteen hours. These cells after being exposed to an ambient temperature of −30° F. for sixteen hours showed a decrease in reverse resistance of .049% and an increase in forward resistance of .43%.

It will be noted from the above results of the tests performed by us that several short exposures of the shortest period are as effective in stabilizing the reverse resistance of the cells as the longer periods. This is indicated by the fact that for all periods tried, the second exposure resulted in a fairly uniform change in the decrease of reverse resistance and the third exposure at the low temperature showed negligible changes in the reverse resistance. It will also be noted that the highest effective stabilizing temperature for the rectifier cells appears to be between 0° F. and −30° F. With a stabilizing temperature of 0° F., stabilization of the reverse resistance occurred on a somewhat erratic basis with some cells exhibiting no response to the treatment, whereas with a stabilizing temperature of −30° F. the reverse resistance of all of the cells tested was effectively stabilized.

We have thus provided a method of stabilizing the reverse resistance of a selenium rectifier cell by exposing the formed rectifier cell to two or more cold treatments and reforming the cells after they have warmed up to room temperature after each cold treatment except the last. In our method of stabilizing the reverse resistance of a selenium cell, stabilizing temperatures of from approximately 0° F. to approximately −100° F. and exposure periods of approximately five minutes to sixteen hours have proven effective so that no permanent changes are effected in the reverse resistance when the cells are subsequently exposed to either high or low temperatures. As previously pointed out, the forward resistance of a selenium cell is stabilized by the initial cold treatment so that any subsequent cold treatments and electroforming to stabilize the reverse resistance have little effect on the forward resistance characteristic.

The cold stabilizing treatment of selenium rectifier cells herein described provides a rectifier cell which may be operated within a wide temperature range. A selenium rectifier cell processed by our methods shows little or no change in the forward or reverse resistance characteristics of the cell upon exposure to high or low temperatures, and negligible changes in the rectifier characteristics due to shelf aging.

Although we have herein described a method of cold treatment for stabilizing the rectifier characteristics of selenium rectifier cells, it is understood that various changes and modifications may be made therein within the scope of the appended claims without departing from the spirit and scope of our invention.

Having thus described our invention, what we claim is:

1. A method of stabilizing the reverse resistance of a selenium rectifier cell comprising the steps of repeatedly exposing the cell to a temperature below 0° F. for at least several minutes during each exposure period, and reforming the cell after each exposure except the last.

2. A method of stabilizing the reverse resistance of a selenium rectifier cell comprising the steps of repeatedly exposing the cell to a temperature below 0° F. for at least five minutes during each exposure period, and reforming the cell after each exposure period except the last.

3. A method of stabilizing the reverse resistance of a selenium rectifier cell comprising the steps of repeatedly cooling the cell from room temperature to approximately 0° F. to —100° F. and maintaining the cell at the chosen temperature for at least five minutes during each cooling period, and reforming the cell after each cooling period except the last.

4. A method of stabilizing the reverse resistance of a selenium rectifier cell comprising the steps of repeatedly cooling the cell from room temperature to approximately 0° F. to —100° F. and maintaining the cell at the chosen temperature for approximately five minutes to sixteen hours during each cooling period, and reforming the cell after each cooling period except the last.

5. A method of stabilizing the reverse resistance of a selenium rectifier cell comprising the steps of exposing the rectifier cell to a temperature below 0° F. for at least two periods of at least five minutes each, permitting the cells to warm up to room temperature after each cold exposure period, and reforming the cells after the cells have reached room temperature after each warming up period except the last.

6. A method of stabilizing the reverse resistance of a selenium rectifier cell comprising the steps of exposing the rectifier cell to a temperature of between 0° F. and —100° F. for at least two periods of approximately five minutes to sixteen hours, permitting the cells to warm up to room temperature after each cold exposure period, and reforming the cells after the cells have reached room temperature after each warming up period except the last.

7. In a method of stabilizing the resistance characteristics of selenium cells after exposing the cells to a temperature below 0° F. comprising the steps of reforming the cells, and then exposing the cells to a temperature below 0° F. for approximately five minutes to sixteen hours.

8. In a method of stabilizing the resistance characteristics of selenium cells after exposing the cells to a temperature between approximately 0° F. and —100° F. comprising the steps of reforming the cells, and then exposing the cells to a temperature between approximately 0° F. and —100° F. for approximately five minutes to sixteen hours.

9. In a method of stabilizing the resistance characteristics of a selenium cell during manufacture, the steps comprising successively exposing the cell to a temperature below 0° F. for a period necessary for all portions of the cell to attain the selected temperature, and reforming the cell between successive exposure periods.

10. In a method of stabilizing the resistance characteristics of a selenium cell during manufacture, the steps comprising successively exposing the cell to a temperature between approximately 0° F. and —100° F. for at least five minutes, and reforming the cell between successive exposure periods after the cell has warmed up to room temperature.

References Cited in the file of this patent

UNITED STATES PATENTS

| | | |
|---|---|---|
| 2,395,259 | Ellis et al. | Feb. 19, 1946 |
| 2,521,687 | Cameron et al. | Sept. 12, 1950 |